US008683195B2

(12) United States Patent
Shen

(10) Patent No.: US 8,683,195 B2
(45) Date of Patent: Mar. 25, 2014

(54) SYSTEM AND METHOD FOR REDUCING FRAUD

(75) Inventor: Eran Shen, Naharya (IL)

(73) Assignee: SanDisk Technologies Inc., Plano, TX (US)

( * ) Notice: Subject to any disclaimer, the term of this patent is extended or adjusted under 35 U.S.C. 154(b) by 1868 days.

(21) Appl. No.: 11/613,067

(22) Filed: Dec. 19, 2006

(65) Prior Publication Data

US 2008/0148045 A1     Jun. 19, 2008

(51) Int. Cl.
*H04L 29/06* (2006.01)

(52) U.S. Cl.
USPC .......................................... 713/156; 713/155

(58) Field of Classification Search
USPC ......................................................... 713/156
See application file for complete search history.

(56) References Cited

U.S. PATENT DOCUMENTS

| | | | | |
|---|---|---|---|---|
| 6,128,740 A * | 10/2000 | Curry et al. | ................. | 713/158 |
| 2002/0188853 A1 * | 12/2002 | Owhadi | ................. | 713/182 |
| 2004/0250076 A1 * | 12/2004 | Kung | ................. | 713/175 |
| 2005/0043548 A1 * | 2/2005 | Cates | ................. | 549/12 |
| 2005/0188196 A1 * | 8/2005 | Kakii | ................. | 713/156 |
| 2006/0015729 A1 * | 1/2006 | Novack et al. | ................. | 713/173 |
| 2006/0047949 A1 * | 3/2006 | Brown et al. | ................. | 713/156 |
| 2006/0265242 A1 * | 11/2006 | Kashioka | ................. | 705/1 |

OTHER PUBLICATIONS

RSA Laboratories, "PKCS #1 v2.1: RSA Cryptography Standard," Jun. 14, 2002, pp. 1-61.
International Telecommunication Union, "Series X: Data Networks, Open System Communications and Security (Information Technology—Open systems interconnection—The directory: public-key and attribute certificate frameworks)," 2005, pp. 1-7 and 9-170.
C. Adams, "Internet X.509 Public Key Infrastructure Certificate Management Protocols," Network Working Group, Mar. 1999, pp. 1-72.
Search Report and Written Opinion for PCT/US2007/024138, 9 pages, Oct. 9, 2008.
Office Action for U.S. Appl. No. 11/613,095, dated Dec. 23, 2009, 11 pages.
Office Action issued Dec. 23, 2009 for U.S. Appl. No. 11/613,095, 10 pages.

* cited by examiner

*Primary Examiner* — Eleni Shiferaw
*Assistant Examiner* — Phy Anh Vu
(74) *Attorney, Agent, or Firm* — Brinks Gilson & Lione

(57) ABSTRACT

Pirated certificates may be published or become available in an environment which includes computer networks and websites. An information appliance connected to the environment searches for certificates in the environment. When a certificate is found in the environment, the appliance determines whether to alert an entity having an interest in the certificate.

25 Claims, 7 Drawing Sheets

CERTIFICATE

```
Certificate:
    Data:
        Version: v3 (0x2)                    ← 66
        Serial Number: 3 (0x3)              ← 64
        Signature Algorithm: PKCS #1 MD5 With RSA Encryption
62 ←    Issuer: OU=Ace Certificate Authority, O=Ace Industry, C=US
        Validity:
            Not Before: Fri Oct 17 18:36:25 1997
    68 ← Not After: Sun Oct 17 18:36:25 1999
        Subject: CN=Jane Doe, OU=Finance, O=Ace Industry, C=US
        Subject Public Key Info:
            Algorithm: PKCS #1 RSA Encryption
            Public Key:
                Modulus:
                    00:ca:fa:79:98:8f:19:f8:d7:de:e4:49:80:48:e6:2a:2a:86:
                    ed:27:40:4d:86:b3:05:c0:01:bb:50:15:c9:de:dc:85:19:2
  2:
                    43:7d:45:6d:71:4e:17:3d:f0:36:4b:5b:7f:a8:51:a3:a1:00

98:ce:7f:47:50:2c:93:36:7c:01:6e:cb:89:06:41:72:b5:e9

73:49:38:76:ef:b6:8f:ac:49:bb:63:0f:9b:ff:16:2a:e3:0e:
                    9d:3b:af:ce:9a:3e:48:65:de:96:61:d5:0a:11:2a:a2:80:b
  0:
                    7d:d8:99:cb:0c:99:34:c9:ab:25:06:a8:31:ad:8c:4b:aa:5
  4:
                    91:f4:15
            Public Exponent: 65537 (0x10001)
        Extensions:
            Identifier: Certificate Type
                Critical: no
                Certified Usage:
                    SSL Client
            Identifier: Authority Key Identifier
                Critical: no
                Key Identifier:
                    f2:f2:06:59:90:18:47:51:f5:89:33:5a:31:7a:e6:5c:fb:36:
                    26:c9
    Signature:
        Algorithm: PKCS #1 MD5 With RSA E
```

FIG. 3

SYSTEM AND METHOD FOR REDUCING FRAUD

CROSS-REFERENCE TO RELATED APPLICATION

This application is related to U.S. patent application Ser. No. 11/613,095, entitled, "System for Reducing Fraud", filed on the same day as the present application; which application is incorporated in its entirety by reference as if fully set forth herein.

BACKGROUND OF THE INVENTION

This invention relates to methods and systems for reducing fraud.

With the rapid spread of the world wide web, and the explosion of commercial and other types of transactions that take place on the world wide web, it has become increasingly important for parties who engage in such transactions to be certain that a person on the other side of a transaction is who he or she represents to be. This is true also where the party on the other side is an organization such as a company.

One of the key concerns to owners and distributors of digital content is that only authorized parties should be allowed to access the content, after the content has been distributed, either through downloads from networks such as the Internet, or through the distribution of content on storage devices. One of the ways to avoid unauthorized access is to use a system for establishing the identity of the party before content access is granted to the party. Systems such as the public key infrastructure (PKI) have been developed for this purpose. In a PKI system, a trusted authority known as a certificate authority (CA) issues certificates for proving the identity of persons and organizations. Parties such as organizations and persons who wish to establish proof of identity may register with the certificate authority with adequate evidence for proving their identities. After the identity of a party has been proven to the CA, the CA will issue a certificate to such party. The certificate typically includes the name of the CA that issued the certificate, the name of the party to whom the certificate is issued, a public key of the party, and the public key of the party signed (i.e. encrypted) by a private key of the CA.

The private key and the public key of the CA are related so that any data signed using the public key may be decrypted by means of the private key, and vice versa. The private key and the public key thus form a key pair. An explanation of the private and public key pair for cryptography is provided in "PKCS#1 v2.1:RSA Cryptography Standard," dated Jun. 14, 2002, from RSA Security Inc. The public key of the CA is made publicly available. Therefore, when one party wishes to verify whether the certificate presented by another party is genuine, the verifying party may simply use the public key of the CA to decrypt the encrypted public key in the certificate. The decryption algorithm for decrypting the signed public key in the certificate is typically also identified in the certificate. If the decrypted public key matches the unencrypted public key in the certificate, this proves that the public key of the party in the certificate has not been tampered with and is verified to be genuine, based on trust in the CA and authenticity of the public key of the CA.

By means of the above mechanism, two parties who otherwise may not trust each other may establish trust by verifying the public key of the other party in the other party's certificate using the process described above. Recommendation X.509 from the International Telecommunication Union (ITU) Telecommunication Standardization Sector (ITU-T) is a standard that specifies certificate frameworks, and is referred to below as the "ITU X.509 standard." More detailed information concerning certificates and their use can be found in this standard.

For convenience in administration, and in large organizations, it may be appropriate for a higher level CA, known as the root CA, to delegate the responsibility for issuing certificates to several lower level CAs. In a two level hierarchy, for example, the root CA at the top level issues certificates to the lower level CAs to certify that the public keys of these low level authorities are genuine. These lower level authorities, in turn, issue certificates to parties through the registration process described above. The verifying process starts from the top of the certificate chain. The verifying party will first use the public key of the root CA (known to be genuine) to first verify the genuineness of the public key of the lower level CA. Once the genuineness of the public key of the lower level CA has been verified, then the genuineness of the public key of the party to whom the lower level issued a certificate can be verified using the verified public key of the lower level CA. The certificates issued by the root CA and by the lower level CA then form a chain of two certificates of the party whose identity is being verified.

Certificate hierarchies may of course include more than two levels, where each CA except for the root CA at a lower level derives its authority from a higher level CA, and has a certificate containing its public key issued by the higher level CA. Therefore, in order to verify the genuineness of another party's public key, it may be necessary to trace the path or chain of certificates to the root CA. In other words, in order to establish one's identity, the party whose identity needs to be proven may need to produce the entire chain of certificates, all the way from its own certificate to the root CA certificate. However, if the root certificate or public key is already known to the verifying party, then there is no need to present the root certificate.

To verify the identity of a party, the verifying party typically will send a challenge (e.g. random number) and ask that the other party send his or her certificate as well as a response to the challenge (i.e. the random number encrypted with the private key of the other party). When the response and certificate are received, the verifying party can then decrypt the response using the public key in the certificate, and compare the result to the random number sent originally. If they match, this means the other party does have the correct private key, and for that reason has proven his or her identity. If the decrypted response fails to match the challenge, authentication fails. Thus, a party wishing to prove his or her identity will need to possess both the certificate and the associated private key.

With the growing use of certificates for secured transactions between parties on the Internet, however, piracy has also grown. For example, users all over the world are sharing files with the assistance of file sharing networks. On many occasions, the files shared are pirated copies of genuine products of copyright owners, such as pirated video, audio as well as other types of data files. The shared files can also include software or other material with copy prevention removed. There is therefore a threat that an attacker may obtain a certificate or certificate chain together with the associated private key by illegitimate means and cause harm in many ways. Thus the attacker may make such pirated certificate or chain of certificates with the associated private key available on file sharing networks and web sites such as File Transfer Protocol (FTP) sites so that unauthorized parties may enjoy privileged and protected content, such as media files, through piracy. The certificate or chain of certificates and the associated private key made available may also be used by thieves to access bank accounts of victims. It is therefore desirable to provide solutions whereby such fraud can be reduced or forestalled.

SUMMARY OF THE INVENTION

Fraud through the illegitimate use of certificates can be reduced by finding certificates in an environment where the illegitimate publication and circulation of certificates is likely or possible. When a certificate is found, it is then determined whether an entity having an interest in the individual certificate is to be alerted. In an embodiment, at least one of the above actions is carried out automatically. In this manner, and as an optional feature, it is possible to render ineffective certificates that are made available to the public and that otherwise may result in piracy. Instances of fraud are thereby reduced. In another embodiment, when a certificate and its associated private key are found, it is determined whether an entity having an interest in the individual certificate is to be alerted.

All patents, patent applications, articles, books, specifications, standards, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 3 is a more detailed illustration of the certificate of FIG. 2.

Identical components in this application are labeled by the same numerals.

DETAILED DESCRIPTION OF EXEMPLARY EMBODIMENTS

A Certificate Authority (CA) that issues a certificate as an authentic proof of the identity of an entity may decide for various reasons to revoke the certificate during its validity period. There are numerous ways to implement revocation. Typically the certificate verifier checks whether a certificate is genuine and whether it has been revoked. See the X.509 Standard.

As noted above, to establish one's identity typically requires possession of the private key that is associated with the certificate. However, some times the private key may be published or otherwise distributed separately from the certificate. It may be cumbersome in some applications to have to search not only for the certificate, but also for the associated private key, before remedial measures are taken to curb fraudulent use of the certificate. A Certificate Authority may adopt a policy where all certificates that are issued by it and that have been published or otherwise made available should be revoked. Thus, in one embodiment, to reduce fraud as a result of certificates published or otherwise made available, it may be desirable to revoke any certificate that is publically accessible irrespective of whether the associated private key has been found or not. Revocation is frequently done through the periodically updated publication of a certificate revocation list, listing references to (e.g. the serial numbers of) certificates that have been revoked. When a reference to a certificate appears on a certificate revocation list, it becomes ineffective in enabling illegitimate access to protected data or content or other types of fraud. The process of certificate revocation is explained in the ITU X.509 standard.

Figure 1:
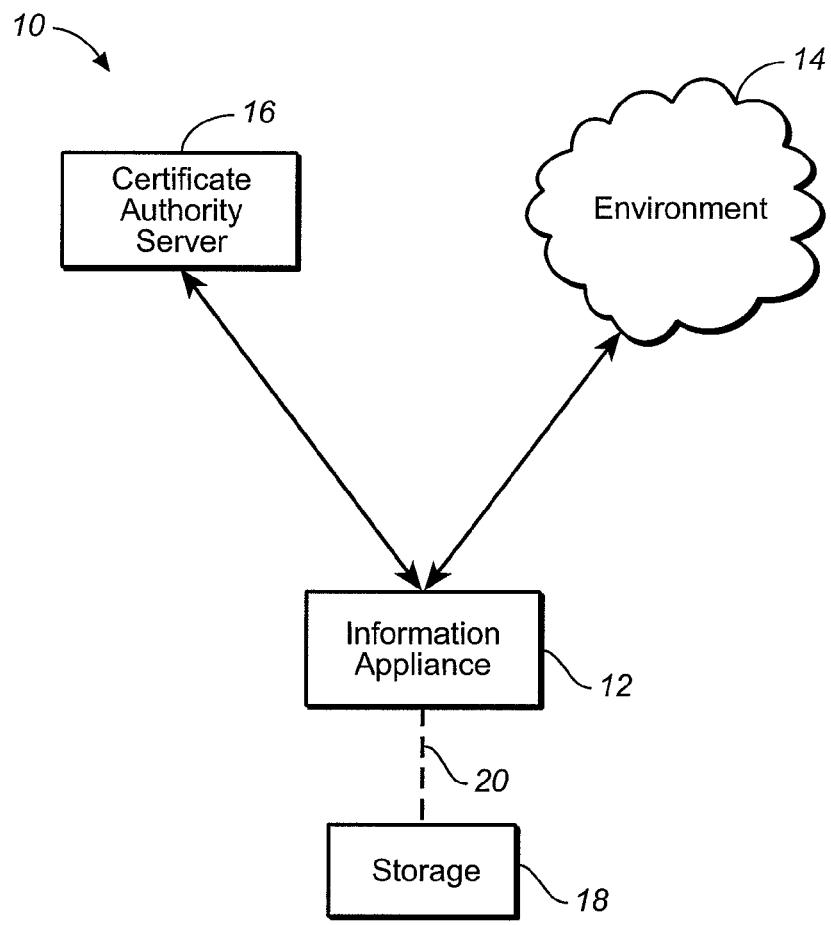
FIG. 1 is a block diagram illustrating one embodiment of the invention.

FIG. 1 is a block diagram 10 illustrating one embodiment of the invention. As shown in FIG. 1, an information appliance 12 is connected to an environment 14 in which pirated certificates may be found. The information appliance 12 searches for certificates in the environment 14, and when a certificate is found in the environment 14, the information appliance 12 alerts a certificate authority server 16 which may have an interest in the certificate that was found. The information appliance 12 may be any one of many types of different devices that can be used to perform the search in the environment, including desktop, laptop and notebook computers, cellular telephones, personal digital assistants, MP3 players and other types of digital media players, set top boxes and any other type of devices that may be used to perform the search and notification of the server 16. The environment 14 includes file sharing networks, Internet websites, private networks such as networks within an organization as well as any other type of digital media or communication links in which pirated certificates may be found. As the usage of different types of digital media and communication channels increases, such media and channels may be used also as avenues for distribution of pirated certificates. It is then useful for appliance 12 to search these types of digital media and communication channels as well. While in the embodiment of FIG. 1, a certificate authority server is notified by appliance 12, in other alternative embodiments, an entity different from a certificate authority may be alerted or notified instead, provided that such entity has an interest in the certificate found by the appliance 12 in the environment.

In reference to FIG. 1, appliance 12 searches documents, files and messages that are published or otherwise made available in environment 14, and looks for certificates based on certificate types that are currently in use by various different certificate authorities. If appliance 12 finds a certificate in environment 14, it is then in a position to notify server 16.

Figure 2:
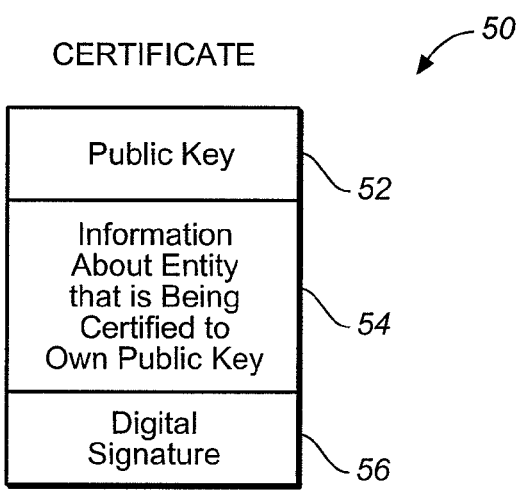
FIG. 2 is a view of a certificate for illustrating an embodiment of the invention.

FIG. 2 is a view of a certificate useful for illustrating an embodiment of the invention. As shown in FIG. 2, certificate 50 includes a public key 52 of the entity to whom the certificate is issued and information about the entity. Certificate 50 also includes a digital signature 56 of the certificate authority, certifying that public key 52 is genuine. FIG. 3 is a more detailed illustration of the certificate 50 of FIG. 2. As shown in FIG. 3, the name of the certificate authority "Ace" is set forth in the issuer field 62. The hashing algorithm and the decryption algorithm (or signature algorithm as shown in FIG. 3) employed in the hashing and decryption of FIG. 6 described below can typically be found in the certificate, such as in field 64 in certificate 50 of FIG. 3. Certificate 50 has a serial number 66 which is "3(0×3)". The validity period of the certificate 50 is defined in field 68.

In some embodiments, it may be desirable for appliance 12 to first verify whether a certificate found in environment 14 is genuine before server 16 is alerted. This is illustrated in the flowchart of FIG. 4.

Figure 4:
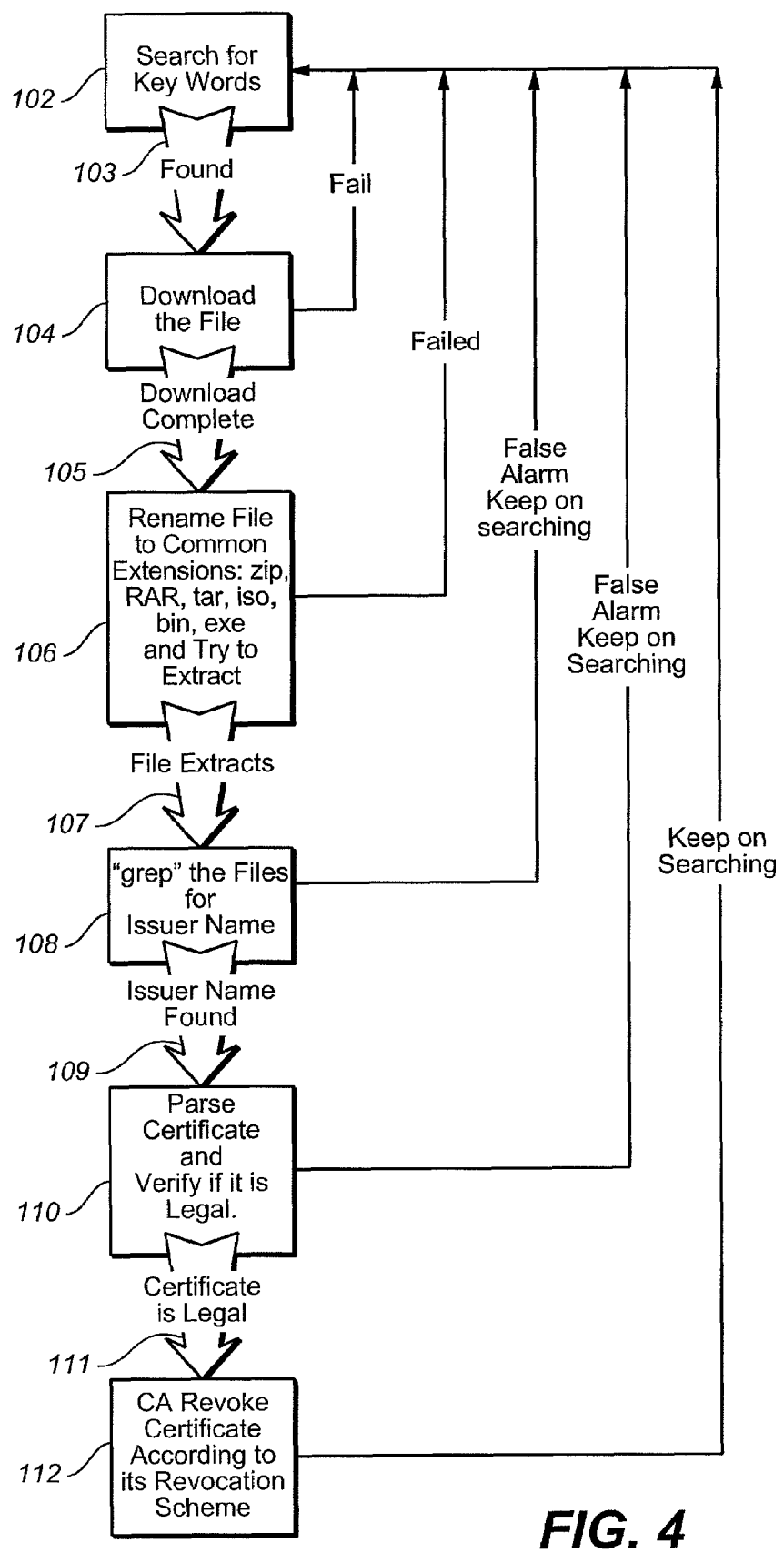
FIG. 4 is a flowchart illustrating one embodiment of the invention.

FIG. 4 is a flowchart illustrating an embodiment of the invention. The information appliance 12 first logs in to the environment 14 shown in FIG. 1, such as a file sharing or peer-to-peer network, or an Internet website. Appliance 12 then searches for key words that are frequently used in certificates (block 102). The key words that may be useful to search include names of products, names of companies that market products including products for enhancing online security, names of online auction websites and of online electronic stores. As activity through the Internet and other media further develops, the list of names that are useful to search will inevitably expand. If a certificate is found in a file or message (arrow 103), the file or message is downloaded in a process on the file sharing network (block 104). If the downloading fails, appliance 12 will return to the searching process in block 102 to search for keywords. If the download is successful and complete (arrow 105), appliance 12 may optionally rename the file or message to one with a common extension, such as ZIP, RAR, far, iso, bin, exe, and tries to extract the needed information from the file or message (block 106).

The renaming of the files or messages is performed for the following reasons. Sometimes hackers or attackers of security systems may use a file extension that does not describe the file in an attempt to escape detection since those who are interested in pirated certificates may only look for certain file types. Thus where the file extension does not correspond to the file type, it may be desirable to rename the file to the correct extension. Appliance 12 may also have a collection of algorithms such as ZIP and RAR. Other possible archive formats can be found in publicly available sources, such as encyclopedias. Other possible archive formats can be constructed using Steganography. See publicly available sources, such as encyclopedias for stenographic methods to unpack the file or message and for extracting information from the file or message. Furthermore, certain files or messages may be compressed, so that the extraction of information from the file or message will first require that the file or message be decompressed first. In such event, appliance 12 also performs the decompression (or compression where necessary) in addition to other steps that may be performed in connection with block 106. If it is still impossible to extract information from the file or message found, appliance 12 returns to search for keywords (block 102).

New file types and corresponding extraction algorithms may be adopted, so that files or messages may appear in such types. These new extraction algorithms may not be in the collection of extraction algorithms in the collection available to appliance 12. Thus when it is not possible in block 106 to extract information from the file or message using the algorithms available, it may be desirable for appliance 12 to search in the Internet or other sources for additional algorithms for extracting information from the file or message. If these algorithms are found, then they can be used for extracting information from the file or message. These algorithms may then also be added to the collection of algorithms stored in appliance 12 or a storage available to appliance 12, so that the algorithms can be used in the future for information extraction as illustrated below in reference to FIG. 7.

If extraction is successful (arrow 107), appliance 12 then looks for the name of the issuer of the certificate. In one embodiment, this may be performed by searching certain particular fields of the certificates. Therefore by searching in field 62 shown in FIG. 3, or other relevant fields, the name of the certificate authority that issued the found certificate can be ascertained (block 108). When the issuer name is found (arrow 109), appliance 12 proceeds to perform the function in block 110. If not, appliance 12 returns to the searching process in block 102.

Figure 5:
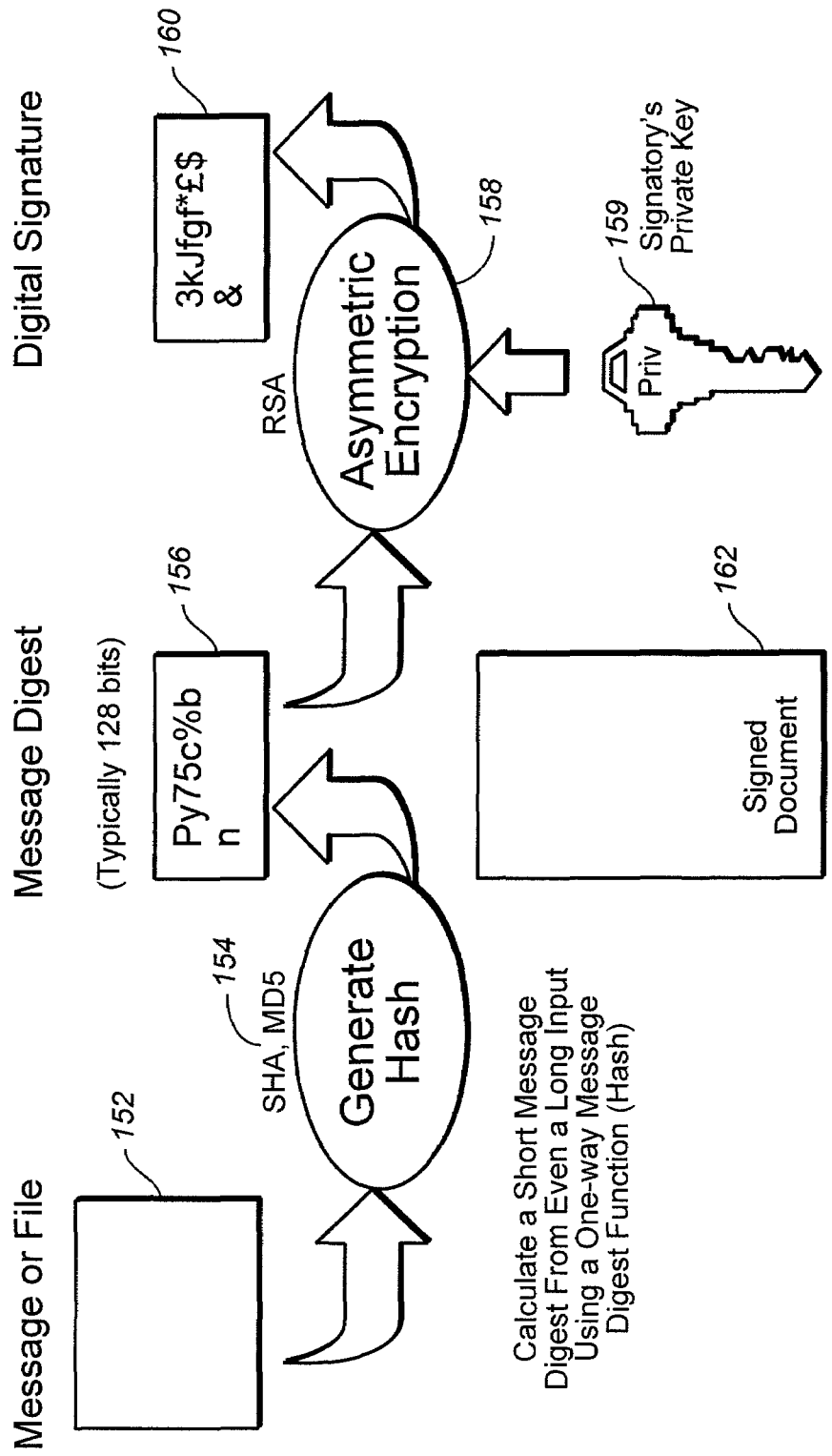
FIG. 5 is a flow diagram illustrating in more detail one feature in an embodiment of the invention.
Figure 6:
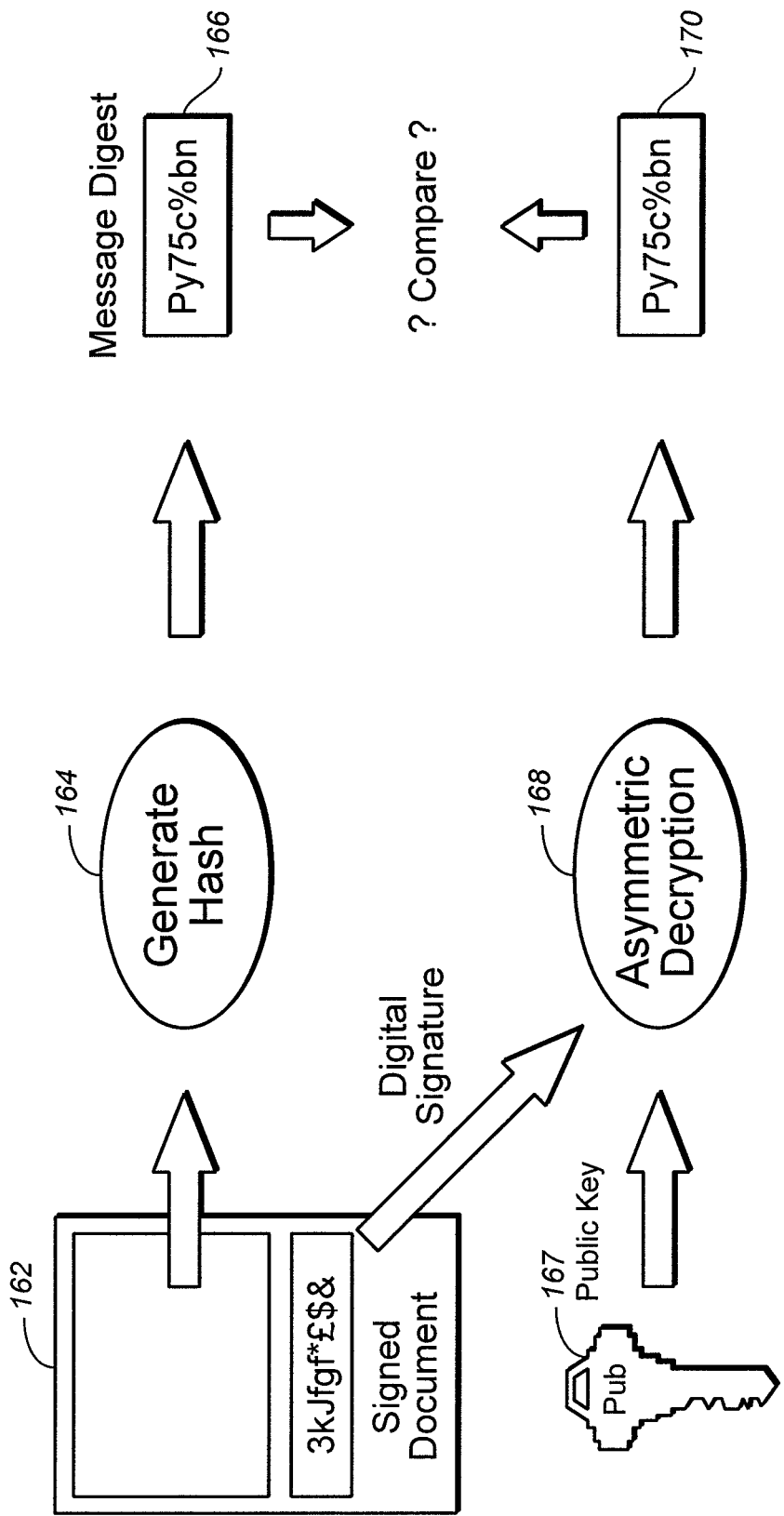
FIG. 6 is a flow diagram illustrating a process for verifying a digital signature useful for illustrating a feature in one embodiment of the invention.

As noted above, in some embodiments, it may be desirable to first verify that the certificate found is genuine before the certificate authority who purportedly issued the certificate is alerted. However, before verification can take place, in some embodiments it may be necessary to first parse the certificate. For example, the certificate can be in one of a number of established formats, such as Base64 and Distinguished Encoding Rules ("DER") so that the parsing will need to take into account these formats. (Block 110). After parsing, appliance 12 then determines when the certificate is genuine (block 110). If the verification of the digital signature in the certificate fails, the appliance returns to the searching process in block 102. The digital signature in the certificate is then verified using the public key of a certificate authority, such as the public key of the certificate authority named in field 62 in FIG. 3. As known to those in the art, public keys of certificate authorities are published so that appliance 12 is able to obtain the public key of the certificate authority required for verifying the signature in the certificate (block 110). The verification process is illustrated in FIGS. 5 and 6. If the digital signature in the certificate is verified to be correct, appliance 12 then concludes that the certificate is legal (arrow 111). In some circumstances, where the appliance 12 can determine the genuineness of a certificate in the environment without the verification process, such as where the same or a similar certificate has been found before, then verification is not necessary for determining whether to alert an interested party, such as a certificate authority that issued the certificate. In one embodiment, appliance 12 alerts the certificate authority, which then revokes the certificate (block 112)

Thus, there is no need for the appliance 12 to alert the interested entity again when the same certificate is found in the environment a second time. However, before appliance 12 alerts the interested entity of a certificate, it needs to be certain that the certificate is genuine. This can be done through verification. Otherwise, an attacker can potentially exploit this for the purpose of launching a denial of service attack. For example, the attacker can publish in the environment fake certificates that contain serial numbers of certificates issued by the target of the attack, even though the attacker does not have the private keys corresponding to such certificates. If the target is then alerted and the target then revokes these certificates, the parties who are relying on such certificates will be denied services enabled by these certificates.

FIG. 5 is a process flow diagram illustrating a process for creating a digital signature. As shown in FIG. 5, a message or file 152 to be signed is first provided, such as the certificate 50 (which contains the public key of an entity and information concerning the entity) as illustrated in FIG. 2. A hash is generated 154 from the message or file using the hashing algorithm specified in the certificate, such as SHA or MD5, to obtain a message or file digest 156 (with value Py75c % bn). The digest is then encrypted 158 through the encryption or signing algorithm specified in the certificate, using the key of a signatory, such as the private key 159 of a certificate authority to obtain the digital signature 160 (with value 3kjfgf*£$&) which may then be used as the digital signature 56 in certificate 50 of FIGS. 2 and 3. The digital signature 160 is then combined with the original message of file 152 into one document: the signed document 162. Thus if the process of FIG. 5 is applied to the certificate 50 of FIG. 2, the public key 52 and information 54 of FIG. 2 are hashed and encrypted to yield the digital signature 56. The digital signature 56 so generated is then combined with elements 52 and 54 to form the signed certificate 50 of FIG. 2.

FIG. 6 is a process flow diagram illustrating a process for verifying the digital signature in a certificate. As shown in FIG. 6, the original message of file 152 in the signed certificate 162 is first hashed in the hashing process 164 using the hashing algorithm specified in the certificate, to generate a file or message digest 166 to obtain the value Py75c % bn. The digital signature 160 (with value 3kjfgf*£$&) in signed document 162 is also decrypted in decryption process 168 using the encryption or signing algorithm specified in the certificate, using a public key 167 of the certificate authority to generate a decrypted document 170, which may have a value Py75c % bn. If the decrypted document 170 matches the file or message digest 166, this means that the public key 167 that is used for decrypting the digital signature 160 in document 162 forms a key pair with the private key 159 (see FIG. 5) of the certificate authority, so that document 162 is genuine.

In reference to FIG. 4, if the certificate is found to be legal or genuine in arrow 111 by a successful verification of the digital signature in the certificate, then appliance 12 alerts server 16. Server 16 may then include a reference to the certificate in a certificate revocation list. Then when the certificate revocation list is updated upon the next update, the serial number of certificate 50 will then appear in the updated certificate revocation list so that certificate 50 will become ineffective for use in unauthorized access of protected data or content or other types of fraud. (Block 112.) The processes of creating and verifying digital signatures are explained in more detail in the ITU X.509 standard. The processes of certificate revocation and of updating certificate revocation list are also explained in the ITU X.509 standard.

Most certificates contain information on the time period during which the certificate is valid. In FIG. 3, for example, information 68 is included in certificate 50 to indicate that the certificate is not valid before a specified time on Oct. 17, 1997 and not after a specified time on Oct. 17, 1999. If a certificate found by appliance 12 during the search contains information indicating that the certificate is no longer valid because of passage of time, for example, the certificate will be ineffective for enabling unauthorized access to protected content or data or other types of fraud. There is no need for the appliance 12 to notify server 16. Therefore in addition to the steps outlined in FIG. 4, appliance 12 may also search for information on the certificate to indicate whether the certificate is valid, such as by comparing the current time to the time period in the certificate during which the certificate is valid. If the time period in the certificate during which the certificate is valid has passed, appliance 12 preferably does not alert server 16; but if such time period has not passed, appliance 12 alerts server 16.

Updated certificate revocation lists are typically periodically published or otherwise distributed by certificate authorities to notify the public of certificates that are no longer valid after issuance. If a certificate found by appliance 12 during the search is already listed on a certificate revocation list of the pertinent certificate authority, there is no need for the appliance 12 to notify the authority. Thus as another optional feature, appliance 12 may search the certificate revocation list of the certificate authority that issued the certificate found in the environment, whether or not the certificate is already referenced on the list. If it is, then there is no need for appliance 12 to notify server 16. If the certificate is not found on the certificate revocation list, then appliance 12 will notify server 16.

In one embodiment, appliance 12 may comprise executable computer code for performing the above described features, and appliance 12 executes such code to perform the various functions described above. In another embodiment, the executable computer or software code for performing the above functions may be stored in a storage device 18 shown in FIG. 1. This storage device may be a removable type of storage (e.g. a flash memory card or any other type of removable non-volatile memory) that can be connected to appliance 12 through connection 20. The program of instructions for carrying out the above described features in the form of computer executable code stored in storage 18 may then be read and executed by appliance 12.

Figure 7:
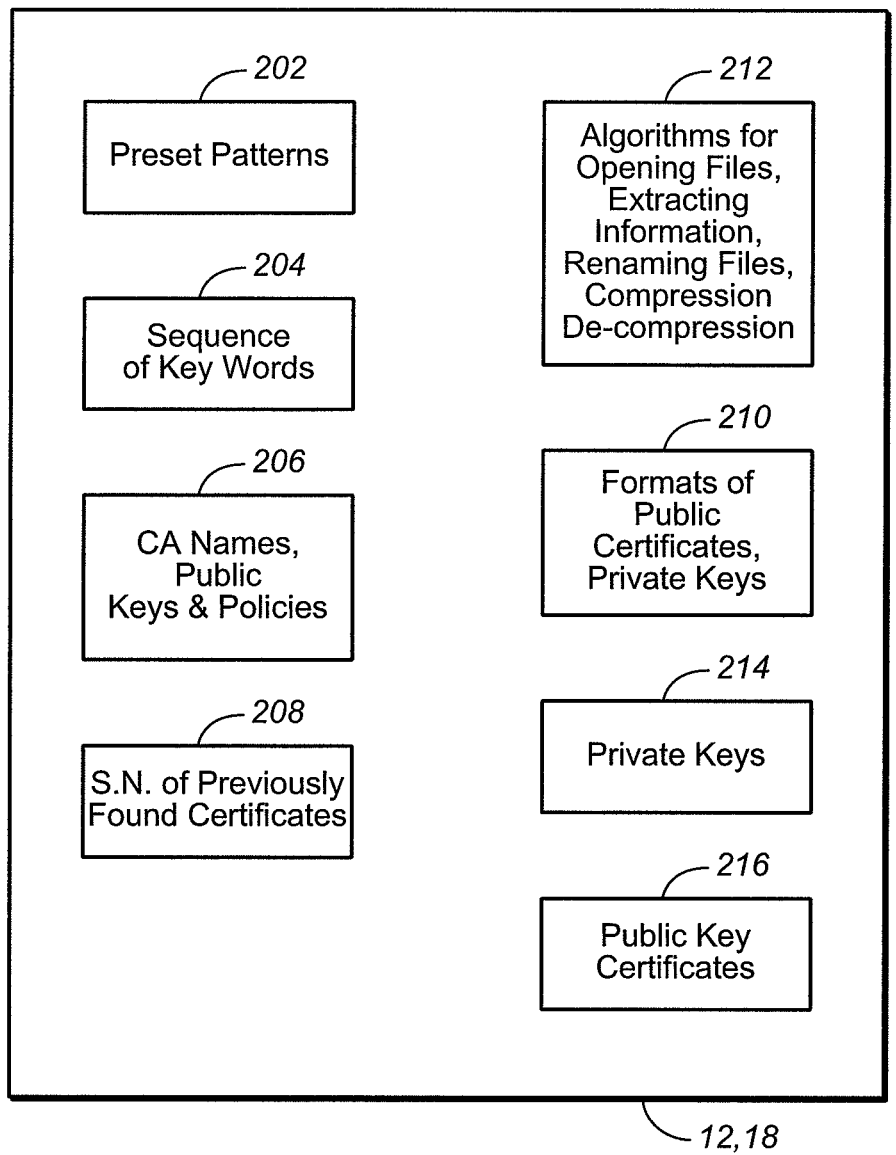
FIG. 7 is a block diagram illustrating the different stores storing information useful for the various flow charts of the different embodiments of the invention.

Many file sharing networks and websites use open source software, so that software readily available can be used or modified to be used for logging in any one of the networks and websites. The software of one or more embodiments in this application can be designed so that the log in process and the sequence of processes (e,g, processes described above in reference to FIG. 4) that follow the log in process can be automatically performed by appliance 12 without a human operator. Once the software is launched, the log in and the following processes will be performed by appliance 12, all without human intervention. Where it is desirable to search multiple networks and websites, and where the known Internet addresses of the networks or websites are specified in the software, the log in processes to these networks or websites can be performed automatically in a preset pattern or order, such as in a fixed sequence, followed by other processes as described above. The preset patterns are stored in a store 202 in appliance 12, or storage 18, as illustrated in FIG. 7. One or more of the other actions carried out by appliance 12 and described above can also be automated. For example, the searching process can be automated by a software design that searches in the issuer field for a number of key words of the types described above in a predetermined order stored in a store 204 in appliance 12, or storage 18. The verification process can be automated by a software design that uses the algorithms specified in the certificates and public keys of the issuers in the certificates to verify the digital signatures in the certificates. Public keys of well known certificate issuers may be stored in a store 206 in appliance 12 or storage 18 for this purpose as illustrated in FIG. 7. Appliance 12 or storage 18 may also store in a store 208 the serial numbers of previously found certificates, so that the appliance can be programmed to automatically alert the certificate authority or another interested party only after it is determined that certificates found in searches have been verified to be genuine and non-duplicative of previously found certificates. Processes such as renaming, compression or decompression and parsing may also be performed automatically, where the software design is such that the algorithms for performing these processes can be executed in predetermined patterns such as in fixed sequences, where the patterns and algorithms are stored in a store 202 in appliance 12, or storage 18, as illustrated in FIG. 7. Automated processes may be advantageous, since certificates can then be searched for and verified constantly, continually or as scheduled on one or more designated networks and websites, and the relevant entity can be alerted where desirable as described above. Alternatively one or more of the processes can be performed using appliance 12 operated by a human operator, while other processes are performed automatically.

Figure 8:
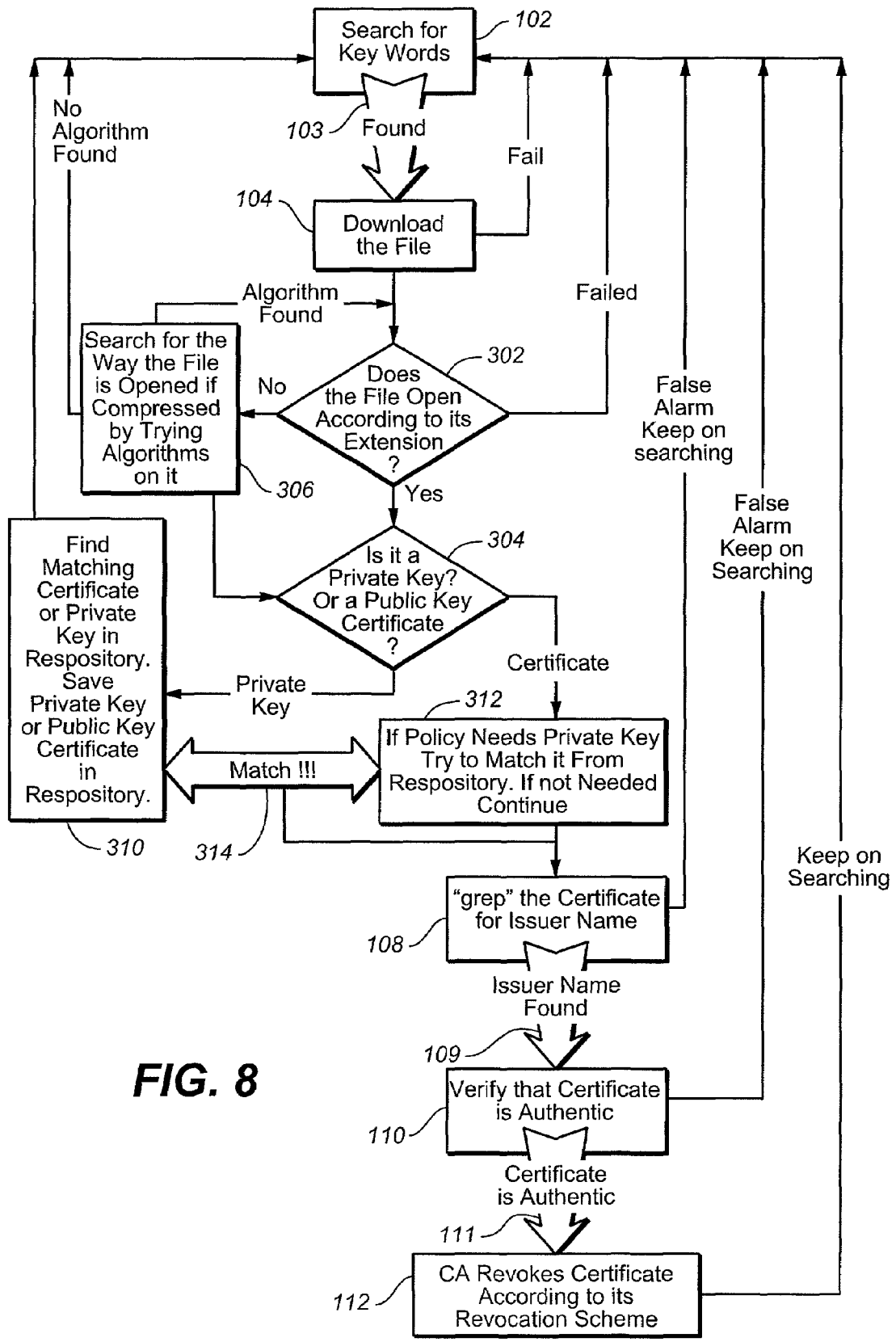
FIG. 8 is a flowchart illustrating another embodiment of the invention.

Different certificate authorities may have different policies regarding whether published certificates should be revoked. Some certificate authorities may have policies by which published certificates should be revoked irrespective of whether the associated private keys are found or not, as described above in reference to FIG. 4 above. Other certificate authorities may have policies by which published certificates should be revoked only when the associated private keys are also found. FIG. 8 illustrates an embodiment, where appliance 12 can adjust its processes to accommodate both types of policies. As shown in FIG. 8, the processes of searching for key words, (block 102), finding the key words (arrow 103), and downloading the file (block 104) are substantially the same as those described above in reference to FIG. 4. Appliance 12 first determines whether the file can be opened according to the file extension and information extracted from it, using algorithms available to it in store 212 of FIG. 7 (diamond 302). If the file can be opened and information extracted from it, using algorithms available to it, appliance 12 determines whether the file contains a private key or a public key certificate (diamond 304). A private key and a public key certificate can be in one of a number of established formats, such as Base64 and Distinguished Encoding Rules ("DER") so that appliance 12 can determine whether the file contains a private key or public key certificate by its format. The established formats may be stored in a store 210 in appliance 12, or storage 18 as shown in FIG. 7. Alternatively, where the file contains an indication that certain data in the file constitute a private key or public key certificate, this indication can be used for the determination.

The determination action in diamond 302 may include renaming, compressing or decompressing the file as described above using algorithms available to it in store 212 of FIG. 7. However, if the file cannot be opened (diamond 302) or information cannot be extracted from the file using algorithms available to the appliance, appliance 12 will be caused to search for algorithms that can be used as described above (block 306). If algorithms for opening the file or extracting information from it cannot be found, appliance 12 returns to search for key words in block 102. If an algorithm that can be used to open the file or extract information from it is found, it is stored in store 212 in FIG. 7 for such algorithms, and the appliance returns to diamond 302 in an attempt to open the file and extract information therefrom.

If the file is determined to contain a private key (diamond 304), it is stored in a repository 214, then a repository 216 in FIG. 7 is searched (block 310) to find a matching public key certificate. Whether there is a match or not can be determined by applying a challenge response mechanism as described above to the private key and the certificates stored in repository 216. If a matching published public key certificate is not found in the repository 216, appliance 12 returns to block 102 to perform more key word searching. However, if a matching published public key certificate is found in the repository 216, appliance 12 proceeds to block 108 to find the certificate issuer name (block 108) as described above in reference to FIG. 4.

If the file is determined to contain a public key certificate, this certificate is stored in repository 216 in FIG. 7 (block 310). The public key certificate is also parsed to find the name of the certificate issuer, and the policy of the CA is checked to determine whether it is necessary to find the private key associated with the certificate (block 312) before the CA or another interested party is alerted. If the policy is that the associated private key is needed, then appliance 12 will attempt to find a matching private key in repository 214 (arrow 314, block 310), by means of a challenge response mechanism as described above. If a matching private key is not found, then appliance 12 returns to block 102. If a matching private key is found, then appliance 12 proceeds to block 108 to find the certificate issuer name (block 108) as described above in reference to FIG. 4.

If the policy of the CA checked in block 312 is to alert an interested party without finding the associated private key once a published public key certificate is found, then appliance 12 proceeds directly from block 312 to block 108 after a public key certificate is found (diamond 304) to find the certificate issuer name as described above in reference to FIG. 4.

Irrespective of the policy of the CA, after the name of the certificate issuer is found (arrow 109), the appliance 12 then parses the certificate if this has not been done already and verifies whether the certificate is genuine (block 110) as described above in reference to FIG. 4. If the certificate is genuine (arrow 111), appliance 12 alerts the pertinent CA, so that the CA revokes the certificate (block 112) as described above in reference to FIG. 4. If instead of alerting a CA, another interested party is alerted, this allows such party to take precautionary measures.

While the invention has been described above by reference to various embodiments, it will be understood that changes and modifications may be made without departing from the scope of the invention, which is to be defined only by the appended claims and their equivalents.

What is claimed is:

1. A method for reducing fraud in an environment, comprising:
   requesting a search for a certificate within the environment, wherein the environment comprises one or more file sharing networks or Internet websites used to store pirated certificates, but outside of a certificate authority device that issued the certificate using an information appliance;
   verifying the certificate found in the environment by determining whether the certificate is genuine; and
   after the certificate found in the environment is verified as being genuine, sending an alert to the certificate authority device that issued the certificate, the alert indicating that the verified, genuine certificate is in the environment;
   wherein the information appliance is in communication with the environment, and the environment is external to the certificate authority device.

2. The method of claim 1, wherein said determining verifies a digital signature in said certificate.

3. The method of claim 1, further comprising said information appliance parsing the certificate after a name of the certificate authority device has been found in the certificate and before verifying the certificate.

4. The method of claim 1, further comprising:
   receiving at least one file from the environment; and
   renaming the at least one file from the environment with at least one predetermined file extension.

5. The method of claim 1, further comprising, after the certificate found in the environment is verified to be genuine, determining by the information appliance whether to send an alert to the certificate authority device; and
   wherein the information appliance sends the alert to the certificate authority device in response to determining to send the alert to the certificate authority device.

6. The method of claim 5, further comprising determining whether the certificate verified to be genuine is still valid; and
   wherein determining whether to send the alert to the certificate authority device comprises:

sending the alert to the certificate authority device if the certificate is still valid; and avoid sending the alert to the certificate authority device if the certificate is no longer valid.

7. The method of claim 6, wherein determining whether the certificate verified to be genuine is still valid comprises:

comparing a current time period to a time period in the certificate; and determining that the certificate is still valid if the current time period is within the time period in the certificate.

8. The method of claim 5, further comprising determining whether the certificate verified to be genuine is on a certificate revocation list associated with the certificate authority device; and wherein determining whether to send the alert to the certificate authority device comprises:

sending the alert to the certificate authority device if the certificate is not on the certificate revocation list; and avoid sending the alert to the certificate authority device if the certificate is on the certificate revocation list.

9. The method of claim 5, wherein determining by the information appliance whether to send the alert to the certificate authority device is dependent on the certificate authority device.

10. The method of claim 9, wherein determining by the information appliance whether to send the alert to the certificate authority device comprises:

determining whether a notification policy of the certificate authority device includes sending the alert to the certificate authority device if an associated private key is found in the environment that is outside of the certificate authority device; and determining whether the associated private key has been found in the environment that is outside of the certificate authority device.

11. The method of claim 5, wherein determining by the information appliance whether to send the alert to the certificate authority device comprises determining whether the information appliance has found an associated private key in the environment that is outside of the certificate authority device.

12. The method of claim 1, wherein the alert indicates that the certificate is publicly accessible.

13. The method of claim 1, wherein the information appliance comprises a computer system configured to search servers.

14. An information appliance configured to reduce fraud in an environment, the information appliance comprising:

an interface configured to request a search of certificates from the environment, wherein the environment comprises one or more file sharing networks or Internet websites used to store pirated certificates, and the environment is outside of a certificate authority device that issued the certificates;

a verifying module configured to verify, using at least one memory, the one or more of the certificates found in the environment to determine whether any of the one or more certificates is genuine; and an alerting module configured to send an alert to the certificate authority device that issued the one or more certificates in response to the verifying module verifying the one or more of the certificates, the alert indicative that the one or more of the certificates verified to be genuine are in the environment that is outside of the certificate authority device.

15. The information appliance of claim 14, wherein the verifying module is configured to verify a digital signature in the one or more certificates.

16. The information appliance of claim 14, further comprising a parsing module configured to parse the one or more certificates for a name of the certificate authority device.

17. The information appliance of claim 14, further comprising a renaming module configured to rename the one or more certificates with at least one predetermined file extension.

18. The information appliance of claim 14, wherein the alerting module is configured to:

determine whether to send an alert to the certificate authority device, and send the alert to the certificate authority device in response to determining to send the alert to the certificate authority device.

19. The information appliance of claim 18, wherein the verifying module is further configured to determine whether the one or more certificates verified to be genuine is still valid; and wherein the alerting module is configured to:

send the alert to the certificate authority device if the at least one or more certificates is still valid; and avoid sending the alert to the certificate authority device if the at least one or more certificates is no longer valid.

20. The information appliance of claim 19, wherein the verifying module is configured to determine whether the one or more certificates verified to be genuine is still valid by:

comparing a current time period to a time period in the one or more certificates; and determining that the one or more certificates is still valid if the current time period is within the time period in the one or more certificates.

21. The information appliance of claim 18, wherein the verifying module is configured to determine whether the one or more certificates verified to be genuine is on a certificate revocation list associated with the certificate authority device; and wherein the alerting module is configured to:

send the alert to the certificate authority device if the one or more certificates is not on the certificate revocation list; and avoid sending the alert to the certificate authority device if the one or more certificates is on the certificate revocation list.

22. The information appliance of claim 18, wherein the alerting module is configured to determine whether to send the alert depending on the certificate authority.

23. The information appliance of claim 22, wherein the alerting module is configured to:

determine whether a notification policy of the certificate authority device includes alerting the certificate authority device if an associated private key is found in the environment that is outside of the certificate authority device; and determine whether the associated private key has been found in the environment that is outside of the certificate authority device.

24. The information appliance of claim 18, wherein the alerting module is configured to determine whether an associated private key has been found in the environment that is outside of the certificate authority device.

25. The information appliance of claim 14,
wherein the alert indicates that the one or more certificates are publicly accessible.

\* \* \* \* \*

UNITED STATES PATENT AND TRADEMARK OFFICE
CERTIFICATE OF CORRECTION

| | |
|---|---|
| PATENT NO. | : 8,683,195 B2 |
| APPLICATION NO. | : 11/613067 |
| DATED | : March 25, 2014 |
| INVENTOR(S) | : Shen |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2007 days.

Signed and Sealed this
Twenty-first Day of July, 2015

Michelle K. Lee
*Director of the United States Patent and Trademark Office*